No. 815,143. PATENTED MAR. 13, 1906.
H. B. CARLTON.
REEL.
APPLICATION FILED JULY 8, 1905.
2 SHEETS—SHEET 1.
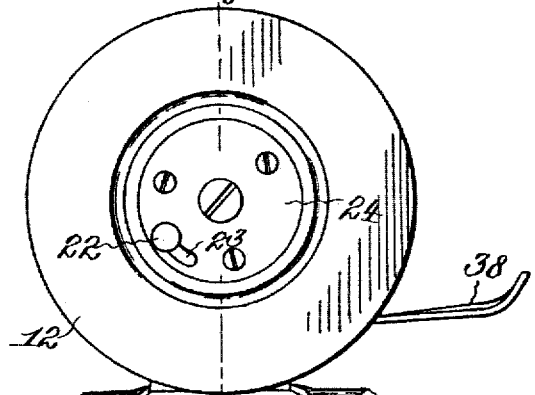
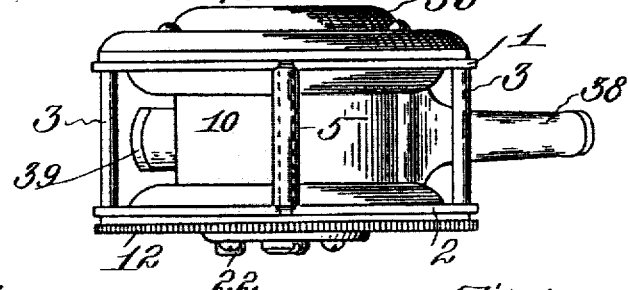
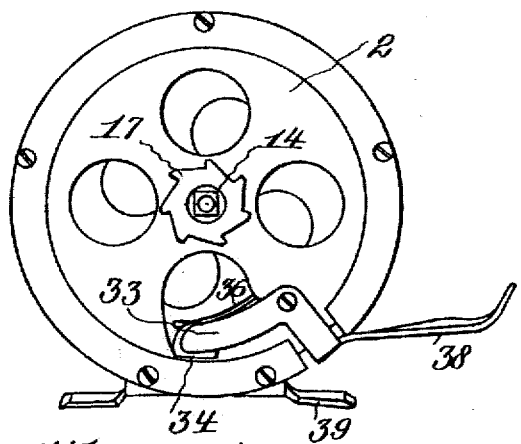
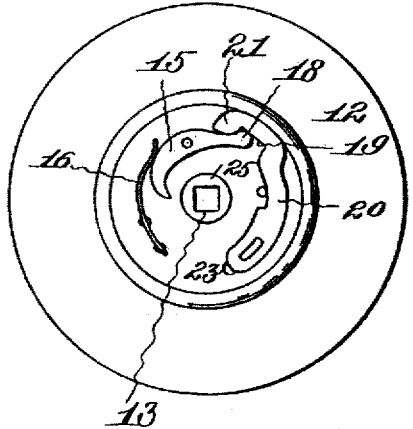
Witnesses:
Inventor
Harvey B. Carlton

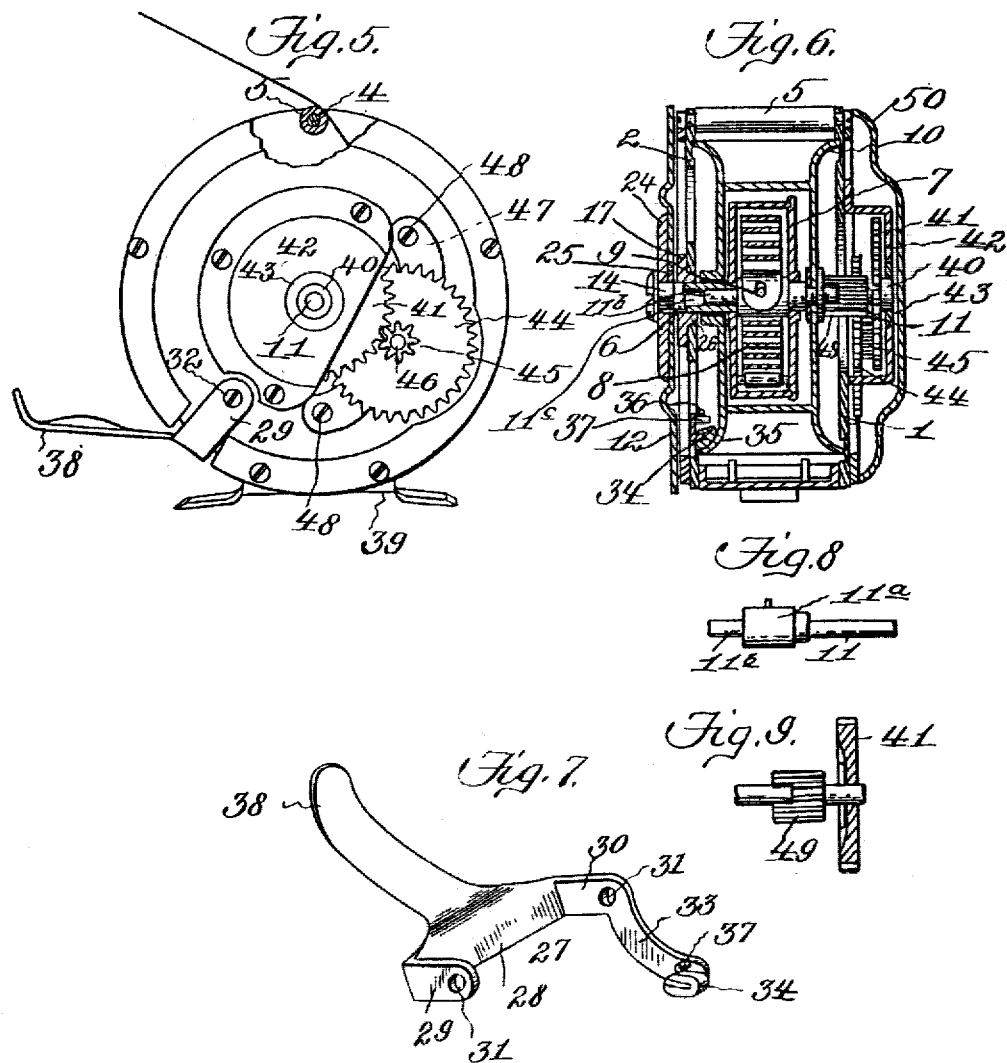

UNITED STATES PATENT OFFICE.

HARVEY B. CARLTON, OF ROCHESTER, NEW YORK.

REEL.

No. 815,143.      Specification of Letters Patent.      Patented March 13, 1906.

Application filed July 8, 1905. Serial No. 268,856.

*To all whom it may concern:*

Be it known that I, HARVEY B. CARLTON, a citizen of the United States, residing at Rochester, in the county of Monroe and State of New York, have invented new and useful Improvements in Reels, of which the following is a specification.

My invention relates to reels of the automatic or spring-actuated type, and has for its general object to provide a reel of this character embodying certain novel features of construction whereby lightness, compactness, and durability of construction are combined with facility and reliability of operation.

Specific objects relate to novel mechanism for relieving the winding-spool from the action of the spring, so that the spool may rotate freely, (as required, for instance, in bait-casting,) or for reëstablishing the connection of parts to enable the spring to be brought into action, and to an antifriction roller or pillar to prevent injury to the line in drawing the latter from the reel with the hand.

In order that the invention may be clearly understood, I have illustrated the same in the accompanying drawings, in which—

Figure 1 is a view in side elevation of the reel. Fig. 2 is a top plan view of the same. Fig. 3 is a view similar to Fig. 1, the winding-disk being removed. Fig. 4 is an inside view of the winding-disk. Fig. 5 is a view of the opposite side of the reel to that shown by Fig. 3 and the cap of the reel being removed. Fig. 6 is a vertical sectional view taken on the line 6 6 of Fig. 1. Fig. 7 is a detail view of the brake device, and Fig. 8 is a detail view of the driving-shaft. Fig. 9 is a detail view illustrating the connection of one of the shafts with a gear-wheel and the construction of a gear loosely mounted on said shaft for engagement with the winding-spool.

Referring now to the drawings, 1 2 indicate the side frame members of the reel, which are connected in the usual manner by pillars 3. In the case of one of these pillars (indicated by 4 in Fig. 5) I provide an antifriction device for the line comprising a sleeve or roller 5, which is mounted to revolve readily upon the pillar 4. The antifriction-roller 5 is provided on the pillar 4, located at the top of the device in the normal position of the parts, and the use thereof will be presently described. Suitably journaled in the side member 2 is a shaft 6, on which is secured the spring-barrel 7, inclosing a spring 8.

10 indicates the winding-spool, which is mounted to rotate freely on the shaft 6 on one side and on an independent shaft 11 at its opposite side. The shaft 11 has a central enlarged portion $11^a$, to which one end of the spring 8 is secured, as indicated at 9, the other end of said spring being secured to the spring-barrel 7. The inner end of said shaft is in the form of a stub-shaft (indicated at $11^b$) and is journaled in the longitudinal aperture $11^c$, extending through the shaft 6.

12 indicates a winding-disk which is preferably provided with a milled edge to facilitate the turning of the same, as shown, and is also provided with a central squared aperture 13, adapted to fit over the outer squared end 14 of the shaft 6. Pivotally mounted intermediate its ends on the inner side of the winding-disk 12 is a pawl 15, which is normally held to position by a spring 16. The pawl 15 is adapted to ride over and engage the teeth of a stationary ratchet 17, mounted on the outer side of the side member 2 and having a central aperture through which the squared end of the shaft 6 projects. In the winding operation the pawl 15 will ride over the teeth of the ratchet 17 and engage said teeth to prevent unwinding of the spring, all as will be clearly apparent. The opposite end of the pawl 15 to that engaging the ratchet 17 is provided with a cam projection 18, which normally seats in a recess 19, provided near the outer end of a slide-plate 20, likewise mounted on the inner side of the winding-disk 12. The said slide-plate 20 is provided at its outer end with a cam projection 21, designed to coöperate with the corresponding projection 18 on the pawl 15. Secured to the slide-plate 20 is a stud having a push-button 22, said stud extending through a slot 23, formed in the winding-disk 12, and in a plate 24, secured on the outer side of said winding-disk. The purpose of the push-button 22 is to enable the slide-plate to be moved to actuate the pawl 15. In the normal position of the parts said pawl occupies the relation to the slide-plate shown by Fig. 4. When it is desired to relieve the winding-spool from the action of the spring 8, the slide-plate 20 is moved through the medium of the button 22 to cause the cam 21 to ride over the cam 18 of the pawl, this movement throwing the outer end of the pawl outward and out of engagement with the teeth of the ratchet 17, thus permitting the winding-disk to revolve and the spring to unwind. So long as the pawl 15 is out of engagement with the ratchet the reel can revolve freely in either direction. The squared aperture 13 for receiving the squared end 14 of the shaft 6 is by preference provided in a circular portion 25, said circular portion 25 being let into the winding-disk 12 and being brazed or otherwise secured to the inner face of the plate 24, through which latter the squared aperture 13 also extends. In like manner the ratchet 17 has a circular portion 26 let into the side member 2 to form a bearing for the shaft 6. The construction of bearings just described is adopted for the reason that for the sake of lightness the frame of the reel is constructed of aluminium, which is relatively soft as compared with other metals, and if the bearings were formed directly in the winding-disk or in the side members said bearings would soon wear away.

27 indicates the brake, which comprises a plate of metal 28, having at opposite ends arms 29 30, extending in parallel relation from one side of the plate 28 and provided near their outer ends with apertures 31, by means of which the brake is pivotally mounted by suitable screws 32 on the outer side of the side members 1 and 2. The arm 30 has a curved extension 33, carrying at its outer end a brake-shoe 34 of any preferred material, preferably leather. The winding-spool 10 is curved outwardly at its edge portions, as indicated at 35, and the brake-shoe 34 is normally pressed downward or outward or in a radial direction against the curved portion of one side of the winding-spool by means of a spring 36, suitably mounted on the inner side of the side plate 2 and bearing on its outer end on a pin 37, carried by the projecting member 33 of the brake.

38 indicates a brake-lever which when the reel is in position on the rod extends backward or toward the operator, so as to be capable of ready operation, my reel being intended to occupy an upright position in use.

39 indicates the reel-support for attaching the reel to the rod in the usual manner. When the spring 8 is being wound by the winding-disk, the pressure of the brake-shoe 34 of the winding-spool will prevent the latter from rotating. By pressing on the brake-lever 38 the brake-shoe is lifted out of contact with the winding-spool, and the latter may then rotate freely under the action of the spring. It will be observed that the pressure of the brake-shoe 34 upon the winding-spool is, as stated above, radially or outward from the axis of the spool, and thus there is no tendency to press the winding-spool sidewise to cause it to bind against the adjacent parts of the reel.

Referring now particularly to Figs. 5, 6, and 9, it will be seen that the shaft 11 is connected with a gear-wheel 41. To this end said gear-wheel is provided on its inner face with a centrally-located slot 51, which is adapted to receive a pin 52, secured in the shaft 11 and extending from opposite sides thereof. The outer end of said shaft extends into a hub 40 on the outer face of the gear-wheel 41, said hub 40 being journaled in a cap-plate 42, secured on the outer side of the side member 1, a suitable bearing 43 being provided for this purpose by means of a piece of hard metal let into the cap-plate 42. This cap-plate 42 provides a housing for the gear 41, as well as for other parts of the driving mechanism, as clearly shown by Fig. 6.

44 indicates a large driven gear which has fixedly secured to one of its sides at the center thereof a spur-gear 45. The said gears 44 and 45 are mounted on a stud 46, passing centrally through them and carried by a bridge-piece 47, secured at its end, as indicated at 48, to the under side of the side member 1. The spur-gear 45 is in mesh with the driving-gear 41, and the driven gear 44 is in mesh with a gear-wheel 49, loosely mounted on the shaft 11 and locked to the side of the winding-spool 10 through the medium of a slot 53, provided in the inner edge of said gear, engaging a corresponding projection on the spool near the center thereof. When the brake is released, motion is imparted to the winding-spool 10 from the spring 8, through the shaft 11, secured to the spring 8, driving-gear 41, secured to the shaft 11, spur-gear 45, secured to the driven gear 44, and the latter gear meshing with the gear-wheel 49 on the winding-spool. The cap-plate or housing 42 and the gearing on the side 1 of the reel are inclosed by means of a cap 50, secured to said side 1, as shown by Fig. 6.

In preparing to make a cast the fisherman ordinarily will remove a certain length of line from the reel by pulling on the line with his left hand, the direction of pull being backward, causing the line to pass over one or the other of the pillars 4 of the reel, and where an enameled line is employed the line is frequently injured in this way. To obviate this, I provide the antifriction-roller 5 on the uppermost pillar 4, this roller permitting the line to run freely and obviating injury thereto, as will be understood from an inspection of Fig. 5. It will be obvious, however, that I may place rollers 5 on two or more of the posts in order to provide an antifriction device for the line at all times when the same is being wound on or drawn from the reel.

Having thus fully described my invention, what I claim as new, and desire to secure by Letters Patent, is—

1. In a spring-actuated reel, in combination with a casing carrying a fixed ratchet, a winding-disk operatively connected with the spring, a spring-controlled pawl carried by said disk, a slide-plate mounted on the disk and operatively associated with said pawl, and means for moving said slide-plate to move the pawl out of engagement with said ratchet or to permit said pawl to be pressed by its spring into engagement with the ratchet.

2. In a spring-actuated reel, in combination with a casing carrying a fixed ratchet, a winding-disk operatively connected with the spring, a spring-controlled pawl pivotally mounted on said disk and having a cam-surface, a slide-plate mounted on said disk and having a cam-surface coöperating with the cam-surface of said pawl, and means for moving said slide-plate whereby, through the engagement of said cam-surface, to move the pawl out of engagement with said ratchet or to permit said pawl to be pressed by its spring into engagement with the ratchet.

3. In a spring-actuated reel, in combination with a spring-barrel containing the spring, a shaft secured to said barrel, a winding-disk mounted on said shaft, a fixed bearing, a gear-wheel having a hub mounted in said bearing, a second shaft having one end of said spring connected thereto and having its outer end secured in the hub of said gear, a winding-spool, and gearing operatively connecting said gear with said winding-spool.

4. In a spring-actuated reel, in combination with a spring-barrel containing the spring, a hollow shaft secured to said barrel, a winding-disk mounted on said shaft, a fixed bearing, a gear-wheel having a hub mounted in said bearing, a second shaft having its inner end journaled in said first-named shaft and being connected to one end of said spring and having its outer end secured in the hub of said gear, a winding-spool, and gearing operatively connecting said gear with said winding-spool.

5. In a reel, in combination with the side frame members, posts connecting the same, and an uninclosed antifriction-roller mounted on one of said posts and extending across the space between the frame members, said roller having an unobstructed surface throughout its length.

6. In combination with a reel having side frame members, an uninclosed antifriction-roller suitably mounted at the periphery of said frame members and extending across the space between the same, said roller presenting an unobstructed surface throughout its length.

In testimony whereof I have hereunto set my hand in presence of two subscribing witnesses.

HARVEY B. CARLTON.

Witnesses:
BESSIE G. SPERBER.
E. L. SMITH.